Sept. 23, 1952     R. J. HARKENRIDER     2,611,367
THERAPEUTIC LAMP SUPPORT AND CONTROL
Filed Feb. 12, 1949     6 Sheets-Sheet 1
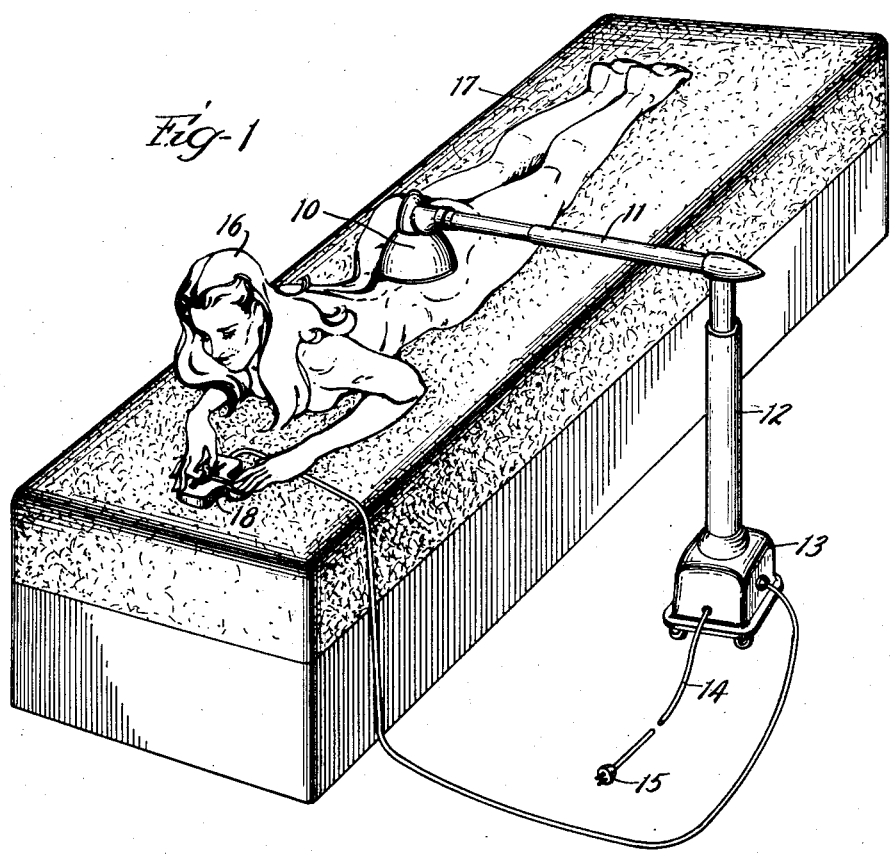
Inventor
Robert J. Harkenrider
By:-
Mann and Brown
Attys

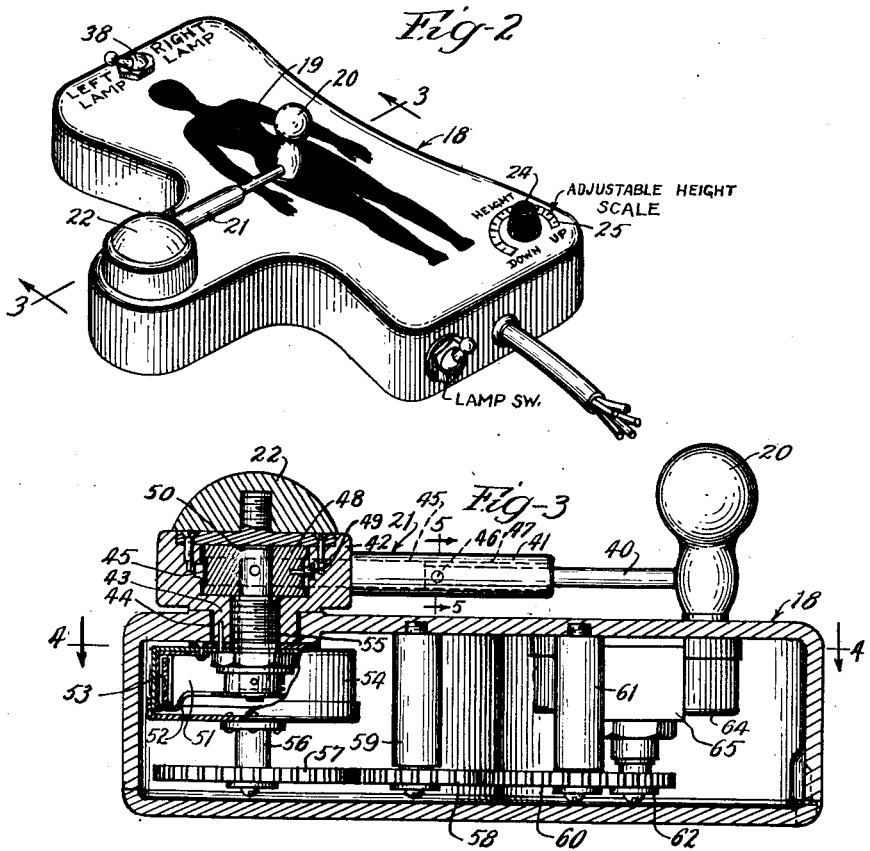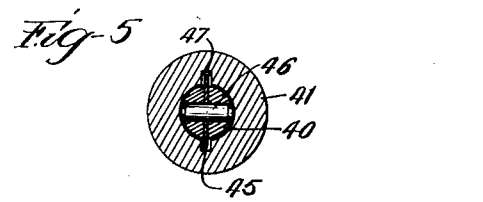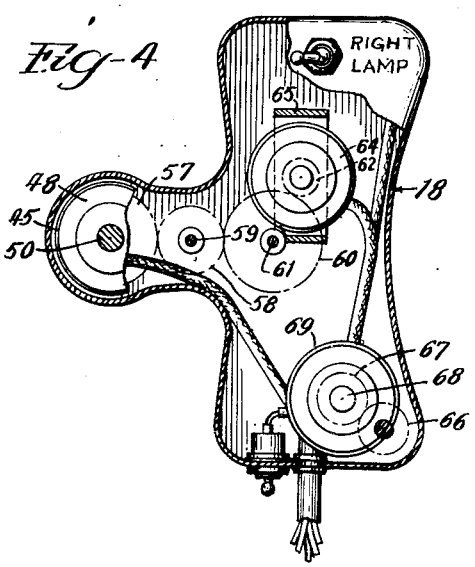

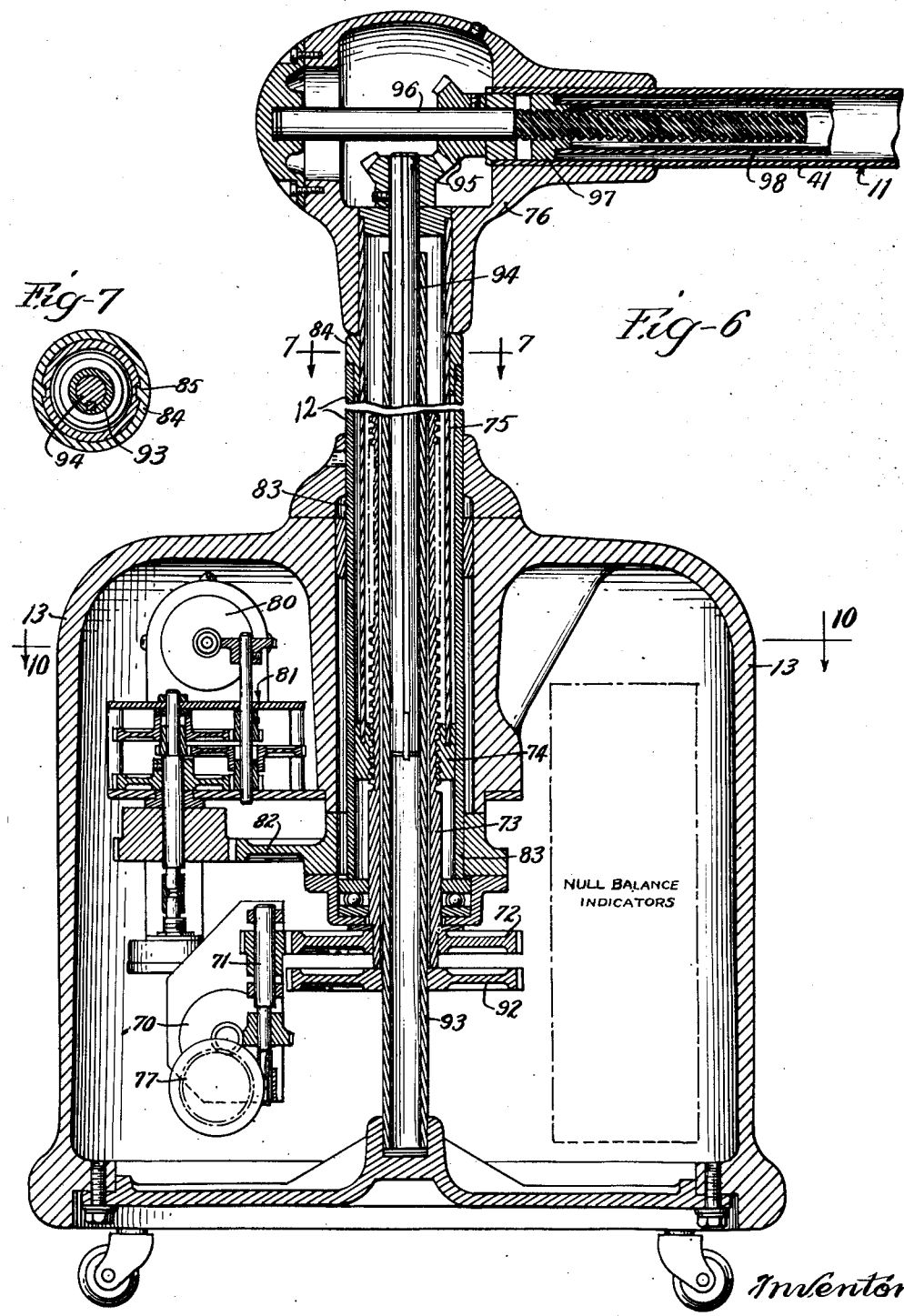

Sept. 23, 1952 R. J. HARKENRIDER 2,611,367
THERAPEUTIC LAMP SUPPORT AND CONTROL
Filed Feb. 12, 1949 6 Sheets-Sheet 4
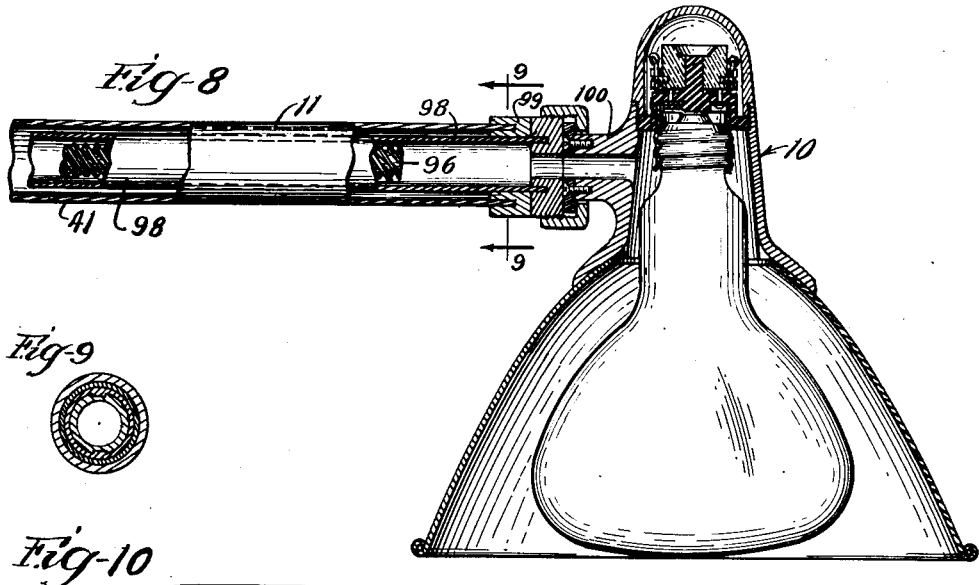
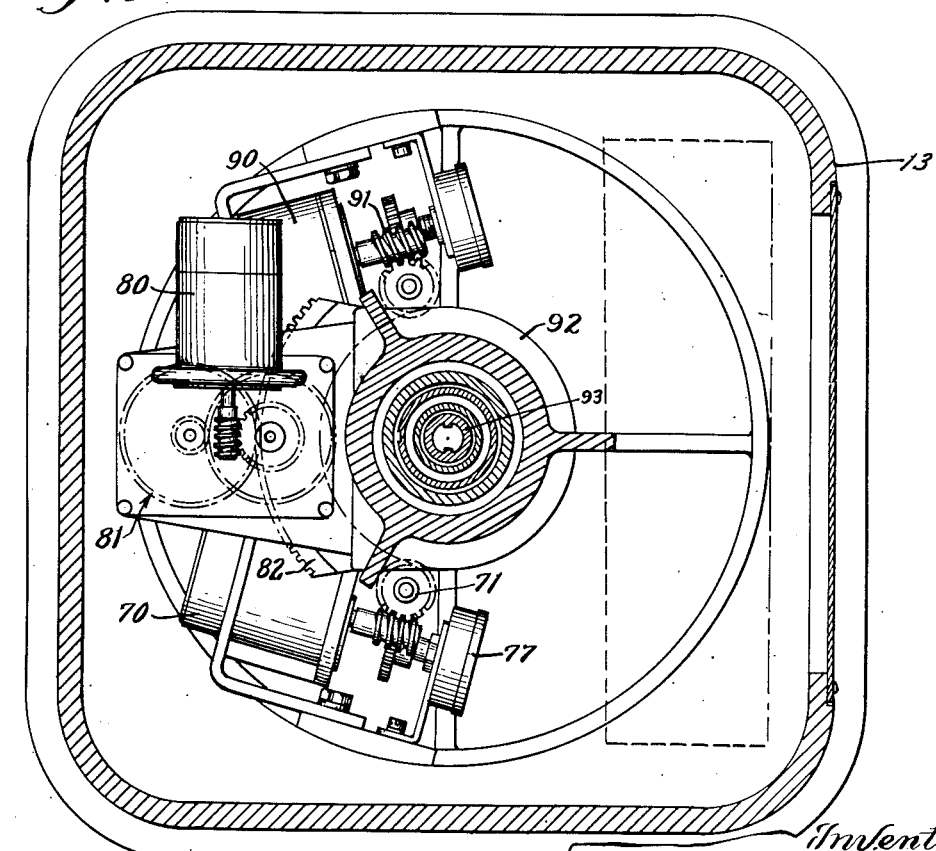
Inventor
Robert J. Harkenrider
By: Mann and Brown
Attys

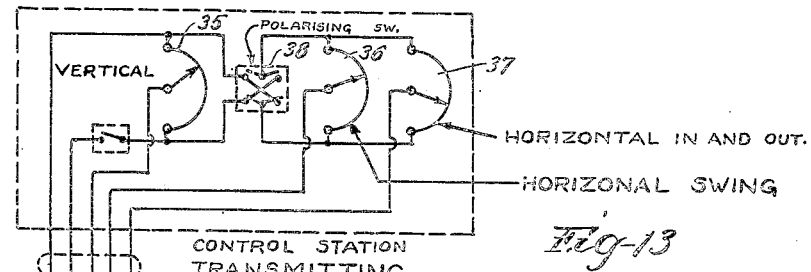
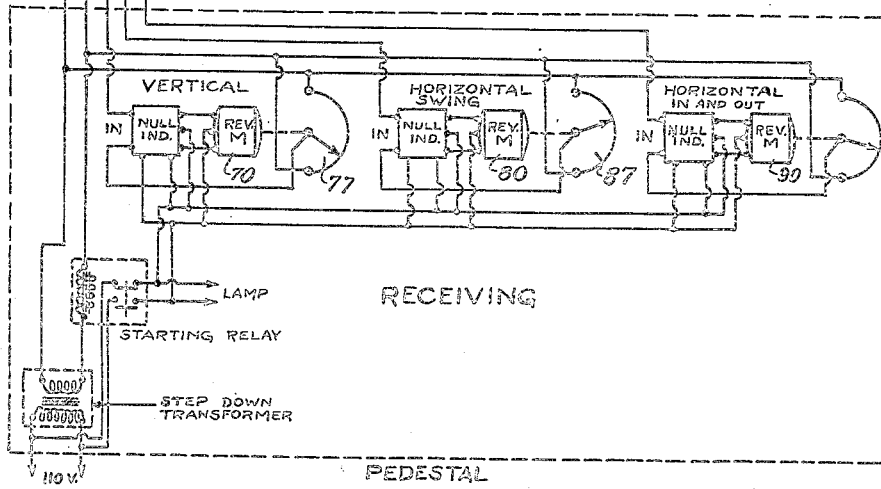
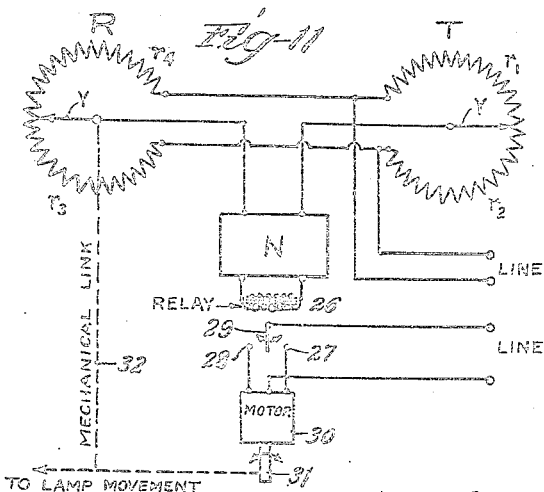
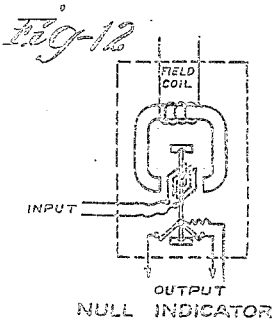

#1 INDUCTANCE BRIDGE

#2 INDUCTANCE CAPACITENCE

Patented Sept. 23, 1952

2,611,367

UNITED STATES PATENT OFFICE 2,611,367

THERAPEUTIC LAMP SUPPORT AND CONTROL

Robert J. Harkenrider, Winona, Minn., assignor to Rudolph W. Miller, Winona, Minn.

Application February 12, 1949, Serial No. 76,080

11 Claims. (Cl. 128—396)

This invention relates to therapeutic lamp or heater apparatus and has for its principal object to provide apparatus by which an unattended person may place the lamp or heater in position and direct it accurately to the exact spot to be treated. Generally speaking, this is accomplished by mounting the lamp or heater on a support with means for moving it up and down, swinging it forward and backward or right to left, and shifting it in and out, as the case may be, and providing the patient with a chart of the human body or a portion thereof associated with a movable position indicator and control handle connected with the means for moving the lamp by position copying means such as telemetering, selsyn or phase shifting mechanism, whereby the movement of the position indicator or other control in the hands of the patient effects corresponding movement of the lamp or heater with respect to the patient's body.

In the drawings,

Fig. 1 is a diagrammatic representation of the apparatus and a patient lying on a bed with the chart convenient to the eyes and the position indicator and controls convenient to the hands;

Fig. 2 is a perspective view of the chart of the human figure on the casing of a control box or station equipped with suitable apparatus, and over which a position indicator or control arm is arranged to be moved in directing the movement of the lamp or heater;

Fig. 3 is a transverse section on the line 3—3 of Fig. 2;

Fig. 4 is a horizontal section on the line 4—4 of Fig. 3;

Fig. 5 is a vertical section on the line 5—5 of Fig. 3;

Fig. 6 is an enlarged vertical section of a movable stand constituting a base and casing for much of the apparatus for supporting and moving the lamp or heater, certain parts being broken away;

Fig. 7 is a horizontal section on the line 7—7 of Fig. 6;

Fig. 8 is a vertical section through a lamp and a portion of the lamp support and means for moving it;

Fig. 9 is a vertical section on the line 9—9 of Fig. 8;

Fig. 10 is a horizontal section on the line 10—10 of Fig. 6;

Fig. 11 is a wiring diagram of the Wheatstone bridge type of telemetering apparatus, several of which may be used to move the lamp or heater in two or more directions;

Fig. 12 is a diagram of a null balance indicator forming part of the apparatus shown in Fig. 11;

Fig. 13 is a wiring diagram of three sets of apparatus corresponding to Fig. 11 for raising and lowering a lamp or heater, swinging it horizontally back and forth, and translating it horizontally in and out or back or forth;

Figure 14:
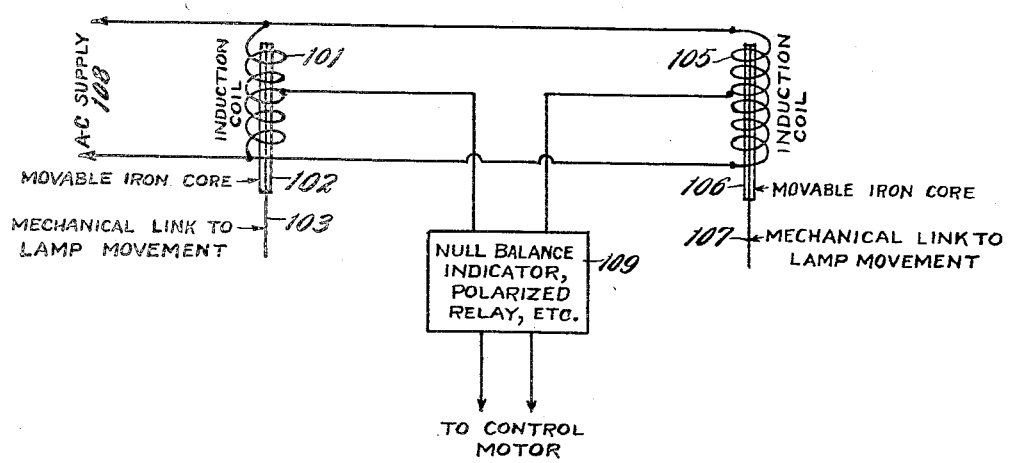
Fig. 14 is a similar diagram of an induction bridge type of position copying means for connecting the position indicator or control with the lamp moving means.

In Fig. 1 there is shown a lamp 10 carried by a telescoping arm 11 mounted to swing on a telescoping column 12, mounted on a base or pedestal 13 forming a housing for the operating mechanism and equipped with cable 14 and plug 15 for connection with a source of electric current.

From this, it will be apparent that the lamp 10 may be raised and lowered, moved inwardly and outwardly with respect to the patient, and swung upwardly and downwardly in Fig. 1, or approximately lengthwise to the patient. These are selective movements for an apparatus intended to treat a patient in a reclining position, but, of course, other movements can be provided for to treat a patient seated or standing.

The lamp is shown in position over a human figure 16 lying face down on the couch or bed 17 with the control station or box 18 convenient to the hands of the figure.

On top of the control box 18 (Fig. 2) there is a chart in the form of a silhouette of a human figure 19, which, from the position of the parts shown in Fig. 1, would give the patient a representation of the patient's figure in the position to be treated.

Over the chart representing the human figure is a position indicator 20 representing the lamp 10 and serving also as a control knob to be received in the right hand of the patient as shown in Fig. 1. That knob 20 is carried by a telescoping arm 21 which permits it to move to the right and left at Fig. 2, or to swing about a vertical axis, passing through the button 22. Thus it will be seen that by telescoping the parts of the rod 21 and swinging it, the position indicator or lamp symbol 20 may be brought directly over the chart 19 indicating the desired relation between the lamp 10 and the figure of the patient 16.

Assuming the relation substantially as illustrated in Fig. 1, the plug 15 connected with a source of current and the appropriate switches being closed, moving the knob 20 over the chart to the spot to be treated or the area to be traversed as above indicated, will move the lamp 10 correspondingly over the patient's body, copying the motion of the knob 20 identically except for magnitude of movement.

Similarly the lamp 10 is raised and lowered by apparatus under the control of the switch button 24, Fig. 2, associated with a scale 25 which may be adjusted to suit the conditions as to requirements of height.

By turning the button 24 to the right in Fig. 2, the lamp 10 will be elevated to the position indicated on the scale 25 by a pointer operated by the button 24. In the alternative, by turning the button to the left, the lamp may be lowered.

The apparatus by which the lamp is made to copy the movements of the control knob or switch button are to be chosen from a large class known as telemetering, selsyn, phase shifting, servomechanism, etc., which terms are somewhat loosely used in the trade and will be covered herein by "position copying means."

One such means is based upon the well-known Wheatstone bridge and is illustrated in Fig. 11 where two wire-wound potentiometers of the radio type, represented by R and T, form the legs of the bridge. The usual galvanometer is replaced by a null balance indicator N or some other device of that character, which feeds a two-position relay 26 having contacts 27 and 28 associated with an arm 29. That relay controls the operation of a reversible electric motor 30, the shaft 31 of which is connected by mechanical linkage 32 with the potentiometer arm Y of the potentiometer R. The shaft 31 is also connected with mechanism for extending or retracting the telescoping column 12 to raise or lower the lamp 10. The potentiometer arm X of the potentiometer T is connected to the knob or button 24 of the control station, Fig. 2.

Assuming the bridge shown in Fig. 11 to be in balanced condition and the button 24 to be in middle position on the scale 25, if that button should be rotated to a new position, the bridge shown in Fig. 11 immediately becomes unbalanced and current flows to the input of the null balance indicator shown somewhat in detail in Fig. 12, and the switch arm 29 closes with one of the contacts 27 and 28, starting the motor 30, and through the appropriate mechanism, extending or retracting the column 12 and raising or lowering the lamp 10. The rotation of the motor also, through mechanical connection 32, swings the potentiometer arm Y along the resistance of the potentiometer R.

The motion set up continues until the bridge circuit in Fig. 11 reaches a balanced or null condition when the relay 26 will go to neutral position and the motor will stop.

Obviously, where desired, the apparatus may include suitable brake mechanism to stop what is known as "hunting."

Similar apparatus may be used to effect the movement of the lamp by extending or contracting the arm 11 in Fig. 1 or swinging it back and forth over the figure 16. Such an arrangement is shown in the wiring diagram, Fig. 13, where the potentiometers 35, 36, and 37 are shown arranged in a control station for transmitting, as appears in the upper part of Fig. 13 where they are marked "Elevating," "Horizontal swing," and "Horizontal in and out" respectively. The wiring indicates that those potentiometers are respectively connected to the null indicators and reversible motors shown in the lower part of the figure and marked respectively "Vertical," "Horizontal swing," and "Horizontal in and out," and together form a receiving apparatus corresponding to the transmitting apparatus in the upper part of Fig. 13.

Also, in the upper part of the figure is shown the switch 38 for crossing the connection to change the polarity and making it suitable to the position of the lamp with respect to the bed, whether on one side or the other.

Specific mechanism

Referring to Fig. 3, the knob 20 is fixed to a rod 40 that telescopes freely in the tube 41, fixed to a hub 42 having a tubular shank 43 journaled in a bearing 44 in the top of the control box 18.

A metallic spring 45 has one end fastened into the slotted end of the rod 40 by pin 46, Fig. 5, and it runs in guides 47 inside the tube 41 and circles about a drum 48 within the hub 42 and is made fast to the drum by a screw 49. The drum 48 is fixed on a vertical shaft 50 of a 1,000 ohm radio type potentiometer 51 within the casing 18, and having an arm 52 for contact with the resistance 53 of the potentiometer, all arranged within the casing 54.

From this it will be apparent that by moving the knob in one direction or the other to shift the rod 40 within the tube 41, the drum 48 and the shaft 50 of the potentiometer 51 will be rotated to move the potentiometer arm 52 along the resistance 53. Assuming that the potentiometer 51 corresponds to the "Horizontal in and out" potentiometer 37 shown in the upper part of Fig. 13, it would set up an unbalanced condition in the Wheatstone bridge circuit and start the corresponding reversible motor 90 shown at the right in the receiving end of the circuit in Fig. 13 in order to raise or lower the lamp 10.

The metal case 54 of the potentiometer 51 is fixed to a shaft 56 equipped with a gear 57 meshing with an idle gear 58 on a shaft 59, which in turn meshes with an idle gear 60 on the shaft 61, which, through a gear 62 obscured in Fig. 3, drives the shaft of a potentiometer 64 secured to the inside of the casing 18 by bracket 65.

From this, it will be apparent that if the telescoping arm 21 is swung about the axis of the hub 42, the button 22, the casing 54 of the potentiometer 51, and the train of gears described will be rotated to change the setting of the potentiometer 64.

Assuming the potentiometer 64 to correspond to that shown in "Horizontal swing" 36 in the upper part of Fig. 13, it would unbalance the Wheatstone bridge circuit and start the corresponding reversible motor 80 shown in the middle of the receiving section to move the arm 11 shown in Fig. 1 to swing the lamp horizontally up or down in the figure or lengthwise to the couch.

The knob or button 24, Fig. 2, drives a gear 66, Fig. 4, meshing with a gear 67 on the shaft 68 of a potentiometer 69.

Assuming the potentiometer 69 corresponds to that shown at "Elevating" 35 in the upper part of Fig. 13, moving the knob 24 to the right or left in Fig. 2 would unbalance the Wheatstone bridge and start the corresponding reversible motor 70 (in Fig. 13) in the receiving section at the left (Fig. 13) to extend or contract the column 12 and thus to raise or lower the arm 11 and the lamp 10.

It remains to give a description of an illustrative mechanism driven by the respective motors shown in the receiving portion of the diagram, Fig. 13, for extending or contracting the column 12, extending or contracting the arm 11 thereon, and for swinging the arm 11 about the axis of the column.

*Elevating mechanism*

The reversible motor 70, shown at the left of the receiving mechanism in Fig. 13, appears within the pedestal 13 (Fig. 6), driving through reduction gearing 71, main gear 72 on a hollow screw shaft 73, working through a threaded nut 74, bearing a tubular column 75 having the angular casing 76 at its upper end supporting the arm 41—11 and the lamp 10. The motor 70, through other reduction gearing, drives the shaft of the potentiometer 77 to move the contact along the resistance.

*Horizontal swing mechanism*

The reversible motor 80, shown in the middle of the receiving section shown in Fig. 13, appears in the pedestal 13 at the upper left, driving through reduction gearing 81 a main gear 82 fixed to tubular column 83 equipped with a head 84 splined to the tubular column 75 (Fig. 7) which latter is fixed in the angular casing 76 and therefore serves to swing the telescoping arm 11 and the lamp 10 about the axis of the column 12.

The same motor 80, through other reduction gearing, drives the shaft of the potentiometer 87 to move the contact along the resistance.

*Horizontal in and out mechanism*

The reversible motor 90, shown at the right of the receiving section in Fig. 13, appears best in the plan view of Fig. 10, driving through reduction gearing 91, a main gear 92 (Figs. 10 and 6), which in turn drives a tubular shaft 93 telescoped with and splined to a shaft 94 (Figs. 6 and 7), driving through bevel gears 95 within the casing 76, a screw shaft 96 threaded through a nut 97 fixed to sleeve 98 splined to a collar 99 (Fig. 9), and bearing the lamp head, generally indicated by 100 (Fig. 8).

As best shown in Fig. 6, the null balance indicators for the receiving section of Fig. 13 are grouped within the casing of the pedestal 13.

*Inductance bridge*

In Fig. 14, there is shown a variation in the position copying means in which a small induction coil 101 in the control station has a movable iron core 102 mechanically linked by means 103 to the control knob or button 24. An identical induction coil 105, also having a movable core 106, is connected by mechanical linkage 107 with the corresponding drive mechanism.

The outside connections of the induction coils 102 and 105 are connected in parallel, as shown, with a source of alternating current 108. The center taps of the induction coils are connected to a null balance indicator, or the like, 109 corresponding to that shown in Fig. 12.

Since any unbalance in the impedance presented by induction coils 102 and 105 due to the positions of their cores will produce an unbalance current which is sensed by the null indicator 109, the output of this indicator is utilized to correct the unbalance by changing the position of the lamp in the proper direction to reestablish current balance due to the linkage of core 106 to the lamp, in a manner per se known.

*Inductance, capacitance*

Figure 15:
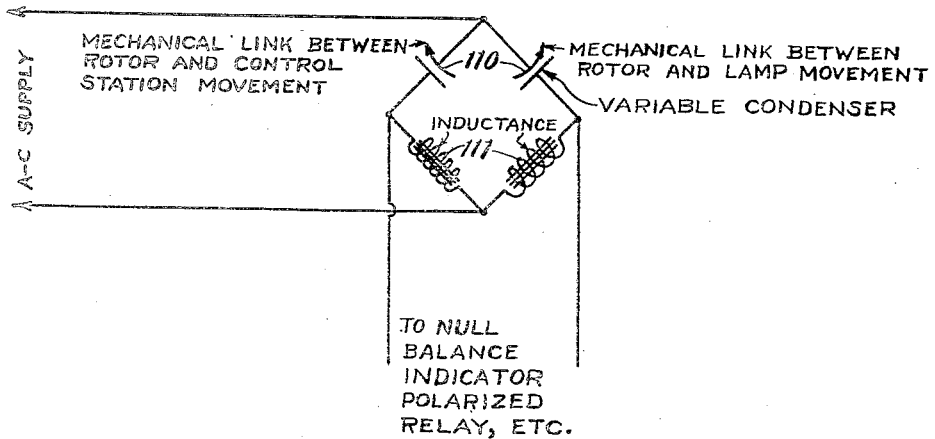
Fig. 15 is a diagram of an inductance capacitance type of position copying means for connecting the position indicator or control with the lamp moving means.

In Fig. 15, there is shown a position copying means of the inductance capacitance kind including radio type variable condensers 110 in connection with fixed inductances 111 in a circuit otherwise made clear by the diagram.

Any unbalance of this inductance-capacity bridge produced by a change in the condenser at the transmitter or control end will produce an unbalance at the null indicator which will alter the lamp position in the direction to reestablish balance by a corresponding change in the corresponding condenser at the receiving end.

These variations shown in Figs. 14 and 15 are two of many that may be used for the position copying means.

I claim:

1. In apparatus for the therapeutic treatment of a body by radiation and the like, a lamp adapted to provide a source of radiant energy, a movable support mounting the lamp for movement to selected positions relative to such body, means simulating the outline of the body to be irradiated, a control member movable to different positions with respect to the means simulating the outline of the body, and mechanism operatively connecting the control member and the movable lamp support for effecting movement of the lamp to different positions with respect to said body corresponding to the positions to which said control member is moved with respect to said means simulating the outline of the body.

2. Apparatus for therapeutic treatment by radiation and the like, comprising a source of radiant energy, means supporting said source for movement to carry said source to different locations with respect to a body to be irradiated, power mechanism connected with said supporting means for moving same, and a control for said power mechanism adapted to be disposed adjacent a body to be irradiated, said control including means simulating the outline of the body undergoing treatment, a manually adjustable control handle movable to various positions with respect to the simulated outline of such body, and means connected to said control handle and the power mechanism for moving said supporting means whereby positions set by movement of said handle will be followed by said source of radiant energy during normal operation of the device.

3. An apparatus of the type set forth in claim 2 in which said control includes a housing having indicia thereon simulating the outline of the body undergoing treatment, said control handle being mounted on said housing for movement with respect to said indicia.

4. In apparatus of the class described, a lamp adapted to provide a source of radiant energy, a movable support mounting the lamp for movement to different operative positions, position indicating means for indicating the position of the lamp in each of its operative positions, and position copying means operatively connecting the position indicating means and the movable support such that movement of the indicating means effects corresponding movement of the lamp.

5. In apparatus of the class described, a lamp adapted to provide a source of radiant energy, a support mounting the lamp and including means to move it to different operative positions, a movable position indicator for indicating the position of the lamp in each of its operative positions, and position copying means operatively connecting the position indicator and the means to move the lamp such that the lamp is moved to correspond with the movement of the indicator.

6. In apparatus for the therapeutic treatment of a body by radiation and the like, a lamp adapted to provide a source of radiant energy, a support mounting the lamp for movement in a plurality of directions with respect to such body, a position indicator for indicating the position of said lamp with respect to the body and movable in a plurality of directions, and position copying means operatively connecting the support for the lamp and the movable means of said position indicator whereby movement of such means effects corresponding movement of the lamp.

7. In apparatus for the therapeutic treatment of a body by radiation and the like, a lamp adapted to provide a source of radiant energy, a movable support mounting the lamp and including means to move it forward and backward into a plurality of different positions with respect to such body, a position indicator for indicating the position of said lamp with respect to such body and including a control handle movable forward and backward in a plurality of directions, and position copying means operatively connecting the support for the lamp and said control handle whereby movement of the control handle to different positions with respect to said indicator effects corresponding movement of the lamp to corresponding positions with respect to such body.

8. In apparatus for the therapeutic treatment of a body by radiation and the like, a lamp adapted to provide a source of radiant energy, a support mounting the lamp and including means to move it forward and backward and to swing it about an axis of rotation to different positions with respect to such body, a position indicator including a control handle, a support for the control handle having extensible, retractible, and swinging movement, and position copying means operatively connecting the lamp support moving means and the position indicator, such that movement of the control handle effects corresponding movement of the lamp.

9. In apparatus for the therapeutic treatment of a body by radiation and the like, a lamp adapted to provide a source of radiant energy, a support for the lamp including a base, a column on the base, an extensible and retractible arm mounted to swing about the column, means mounting the lamp in fixed position on said arm, a position indicator and control handle, a support for the position indicator and control handle having extensible, retractible, and swinging movement, and position copying means operatively connecting the arm on the column and the position indicator and control handle in a manner such that movement of the latter effects corresponding movement of the lamp.

10. In apparatus for the therapeutic treatment of a body by radiation and the like, a lamp adapted to provide a source of radiant energy, a support mounting the lamp and including means to move it into a plurality of different positions with respect to said body, a position indicator for indicating the position of said lamp with respect to such body and including means movable in a plurality of directions, and position copying means operatively connecting the support moving means and the movable means of said position indicator and including a transmitter operated by the position indicator and a receiver operating the support for the lamp.

11. In radiant treatment apparatus, a source of radiation, a support for a body to be treated, power mechanism operatively connected to said source for moving the same so as to overlie different portions of said support, and a control for said mechanism, said control comprising a manually movable knob, an electrical position-transmitting means operatively connected to said knob and said power mechanism for effecting operation of the latter in response to movement of the former, the operation of said power mechanism being such as to effect movement of said source of radiation corresponding to movement of said knob.

ROBERT J. HARKENRIDER.

REFERENCES CITED

The following references are of record in the file of this patent:

UNITED STATES PATENTS

| Number | Name | Date |
|---|---|---|
| 1,669,468 | Heintze | May 15, 1928 |
| 1,868,523 | De Florez | July 26, 1932 |
| 2,097,537 | Snyder | Nov. 2, 1937 |
| 2,391,881 | Clay | Jan. 1, 1946 |
| 2,491,224 | Stava | Dec. 13, 1949 |

FOREIGN PATENTS

| Number | Country | Date |
|---|---|---|
| 607,028 | France | Mar. 22, 1926 |